（12) United States Patent
Arikawa

(10) Patent No.: US 10,900,568 B2
(45) Date of Patent: Jan. 26, 2021

(54) SEALING STRUCTURE

(71) Applicant: EAGLE INDUSTRY CO., LTD., Tokyo (JP)

(72) Inventor: Tatsuhiro Arikawa, Tokyo (JP)

(73) Assignee: EAGLE INDUSTRY CO., LTD.

( * ) Notice: Subject to any disclaimer, the term of this patent is extended or adjusted under 35 U.S.C. 154(b) by 106 days.

(21) Appl. No.: 16/092,186

(22) PCT Filed: May 9, 2017

(86) PCT No.: PCT/JP2017/017520
§ 371 (c)(1),
(2) Date: Oct. 8, 2018

(87) PCT Pub. No.: WO2017/195770
PCT Pub. Date: Nov. 16, 2017

(65) Prior Publication Data
US 2019/0154151 A1 May 23, 2019

(30) Foreign Application Priority Data

May 13, 2016 (JP) ................................. 2016-097149

(51) Int. Cl.
*F16J 9/12* (2006.01)
*F16J 15/18* (2006.01)
(Continued)

(52) U.S. Cl.
CPC ...... *F16J 9/12* (2013.01); *F15B 1/24* (2013.01); *F15B 15/14* (2013.01);
(Continued)

(58) Field of Classification Search
CPC ........ F16J 9/12; F16J 9/14; F16J 9/145; F16J 9/16; F16J 9/18; F16J 9/20; F16J 15/16;
(Continued)

(56) References Cited

U.S. PATENT DOCUMENTS 3,443,486 A * 5/1969 Lanman ............... F16J 15/3204
  92/244
3,678,809 A * 7/1972 Doutt ....................... F16J 15/56
  92/86
3,953,213 A * 4/1976 Gasper ..................... F16J 1/008
  277/438
4,067,584 A 1/1978 Hunger
(Continued)

FOREIGN PATENT DOCUMENTS

CN 102261464 A 11/2011
CN 103097745 A 5/2013
(Continued)

OTHER PUBLICATIONS

Extended European Search Report for Patent Application No. EP17796131.5 dated Apr. 25, 2019 (10 pages).

*Primary Examiner* — Nathan Cumar
(74) *Attorney, Agent, or Firm* — Harness, Dickey & Pierce, P.L.C.

(57) ABSTRACT

A seal structure is provided which enables a reduction in the number of components and an improvement of the stability in sliding of the seal portion or the backup ring portion. A sealing structure seals two members which move relative to each other, in which a seal portion or a backup ring portion placed between the two members and a bearing portion similarly placed between the two members are formed into an integral structure. The seal portion or the backup ring portion is integrally provided to one end portion in the axial direction or both end portions in the axial direction of the bearing portion having a cylindrical shape. The seal structure is used as a piston seal or a rod seal in hydraulic and pneumatic devices in which a piston is inserted into a shell or a cylinder tube.

4 Claims, 9 Drawing Sheets

(51) Int. Cl.
*F16F 9/36* (2006.01)
*F16C 33/74* (2006.01)
*F15B 15/14* (2006.01)
*F15B 1/24* (2006.01)

(52) U.S. Cl.
CPC ...... *F15B 15/1452* (2013.01); *F15B 15/1461* (2013.01); *F16C 33/74* (2013.01); *F16F 9/36* (2013.01); *F16F 9/363* (2013.01); *F16F 9/368* (2013.01); *F16J 15/18* (2013.01); *F15B 2201/312* (2013.01); *F16F 2230/30* (2013.01)

(58) Field of Classification Search
CPC .... F16J 15/56; F16J 15/18; F15B 1/24; F15B 15/14; F15B 15/1452; F15B 15/1461; F15B 2201/312; F15B 2230/30; F16C 33/74; F16F 9/36; F16F 9/325; F16F 9/3485; F16F 9/432; F16F 9/363
USPC .......................................................... 277/488
See application file for complete search history.

(56) References Cited

U.S. PATENT DOCUMENTS

| | | | | |
|---|---|---|---|---|
| 4,305,595 A | * | 12/1981 | Miyagishima | F16J 15/166 277/638 |
| 2009/0260516 A1 | * | 10/2009 | Fukui | F15B 15/1419 92/168 |
| 2011/0285095 A1 | * | 11/2011 | Okuma | F15B 15/1452 277/628 |
| 2012/0304855 A1 | * | 12/2012 | Funato | F15B 15/1452 92/172 |

FOREIGN PATENT DOCUMENTS

| | | |
|---|---|---|
| CN | 205047566 U | 2/2016 |
| EP | 1703181 A1 | 9/2006 |
| JP | S51-068965 U | 5/1976 |
| JP | S52-162359 U | 12/1977 |
| JP | H07-028202 U | 5/1995 |
| JP | 2003-120602 A | 4/2003 |
| WO | WO-2008-029699 A1 | 3/2008 |

* cited by examiner

SEALING STRUCTURE

CROSS-REFERENCE TO RELATED APPLICATIONS

This application is a U.S. National Stage Application of International Application No. PCT/JP2017/017520, filed on May 9, 2017, and published in Japanese as WO 2017/195770 A1 on Nov. 16, 2017 and claims priority to Japanese Application No. 2016-097149, filed on May 13, 2016. The entire disclosures of the above applications are incorporated herein by reference.

TECHNICAL FIELD

The present invention relates to a sealing structure sealing a seal fluid or the like. The sealing structure of the present invention is used in the automobile-related field or used in the industrial machine field and the like, for example. The sealing structure of the present invention is used as a sealing structure of hydraulic and pneumatic devices, such as an accumulator and a hydraulic cylinder, for example.

RELATED ART

Heretofore, a sealing structure 101 illustrated in FIG. 8 is known as a sealing structure for use in a piston type accumulator 1 which is a kind of the hydraulic and pneumatic device. The sealing structure 101 is structured so that seal portions 102 sealing a seal fluid, such as seal gas or a fluid, backup ring portions 103 backing up the seal portions 102, and a bearing portion 104 coaxially holding a piston 3 to a shell 2 are attached to an outer periphery portion of the piston 3 to be inserted into the shell 2 as illustrated in FIG. 9 in an enlarged manner.

However, according to the conventional technique, the seal portions 102 and the bearing portion 104 are separate components and the backup ring portions 103 and the bearing portion 104 are also separate components, and therefore there is room for a further improvement in the following respects.
a) Since the sealing structure 101 has a large number of components, it takes much time and effort to manufacture and handle the components.
b) Although the seal portions 102 directly receive the pressure of the seal fluid, the seal portions 102 are merely mounted in a mounting groove 10 together with the backup ring portions 103 and are not particularly held anywhere. Therefore, the stability in sliding is low, and the seal portions 102 are inclined in sliding in some cases.
c) Although a thickness t of the backup ring portions 103 is small, the backup ring portions 103 are merely mounted in the mounting groove 10 together with the seal portions 102 and are not particularly held anywhere. Therefore, the stability in sliding is low, and the backup ring portions 103 are inclined in sliding in some cases.

In view of the above-described respects, it is an object of the present invention to provide a seal structure which enables a reduction in the number of components and an improvement of the stability in sliding of a seal portion or a backup ring portion in comparison with conventional techniques.

SUMMARY

In order to achieve the above-described object, a sealing structure of the present invention is a sealing structure sealing two members which move relative to each other, in which a seal portion or a backup ring portion placed between the two members and a bearing portion similarly placed between the two members are formed into an integral structure.

By forming the seal portion or the backup ring portion and the bearing portion into the integral structure, the number of components can be reduced and, moreover, since the seal portion or the backup ring portion is held by the bearing portion, the stability in sliding thereof can be improved. The integral structure desirably includes the following aspects.

By integrally providing the seal portion to one end portion in the axial direction or both end portions in the axial direction of the bearing portion having a cylindrical shape, the seal portion and the bearing portion are formed into an integral structure. The seal portion may be combined with a back ring.

By integrally providing a backup ring portion to one end portion in the axial direction or both end portions in the axial direction of the bearing portion having a cylindrical shape, the backup ring portion and the bearing portion are formed into an integral structure.

The sealing structure of the present invention is used as a piston seal or a rod seal in a piston type accumulator in which a piston is inserted into a shell, a hydraulic cylinder in which a piston is inserted into a cylinder tube, or the like.

Effect of the Invention

As described above, the present invention can reduce the number of components and can improve the stability in sliding of a seal portion or a backup ring portion in comparison with conventional techniques.

DETAILED DESCRIPTION

Next, embodiments of the present invention are described with reference to the drawings.

First Embodiment

Figure 1:
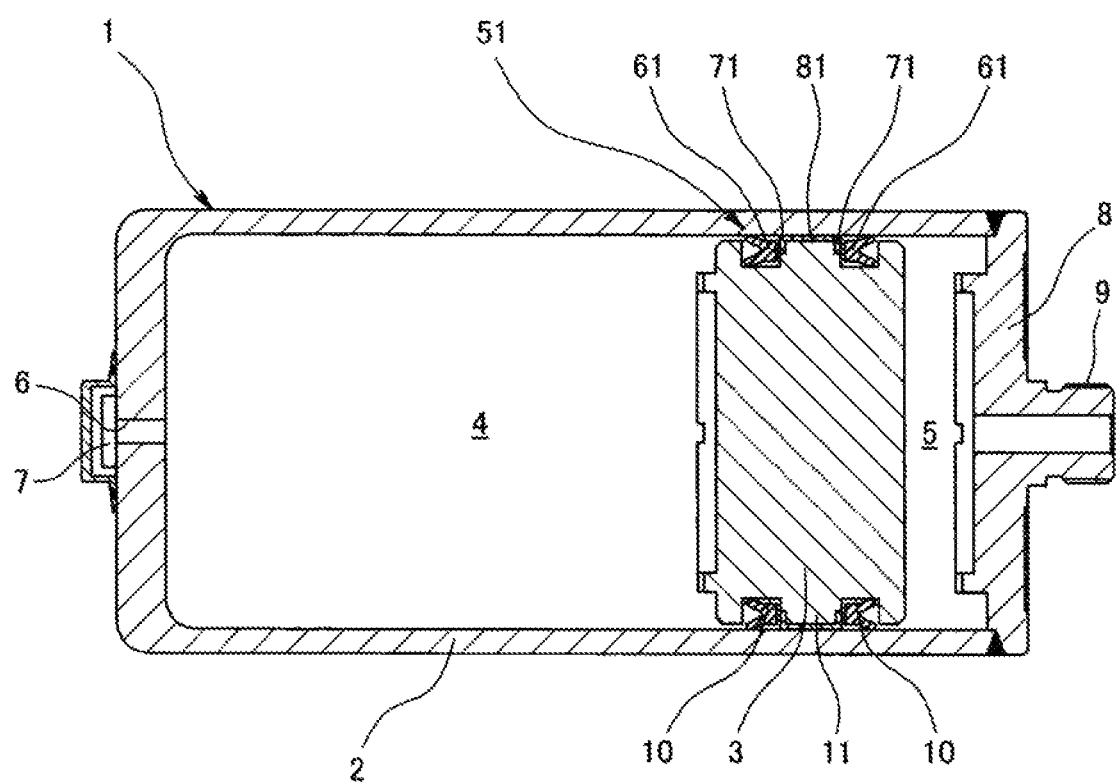
FIG. 1 is a cross-sectional view of a piston type accumulator having a sealing structure according to a first embodiment of the present invention.

FIG. 1 illustrates a piston type accumulator 1 having a sealing structure 51 according to a first embodiment of the present invention, in which the internal space of a shell 2 is divided into a gas chamber 4 sealing gas (gas, such as nitrogen gas) and a fluid chamber (liquid chamber) 5 introducing a fluid (liquid, such as pressure oil) by the slidable insertion of a piston 3 into the shell 2 as an accumulator housing. In a bottom surface portion of the shell 2 having a bottomed cylindrical shape, a gas injection hole 6 is provided and is hermetically sealed by a plug 7, an oil port 8 is fixed to an opening portion of the shell 2, and a connection portion 9 to pressure piping is provided thereto.

Between the shell 2 and the piston 3, the sealing structure 51 according to this embodiment is provided.

Figure 2A:
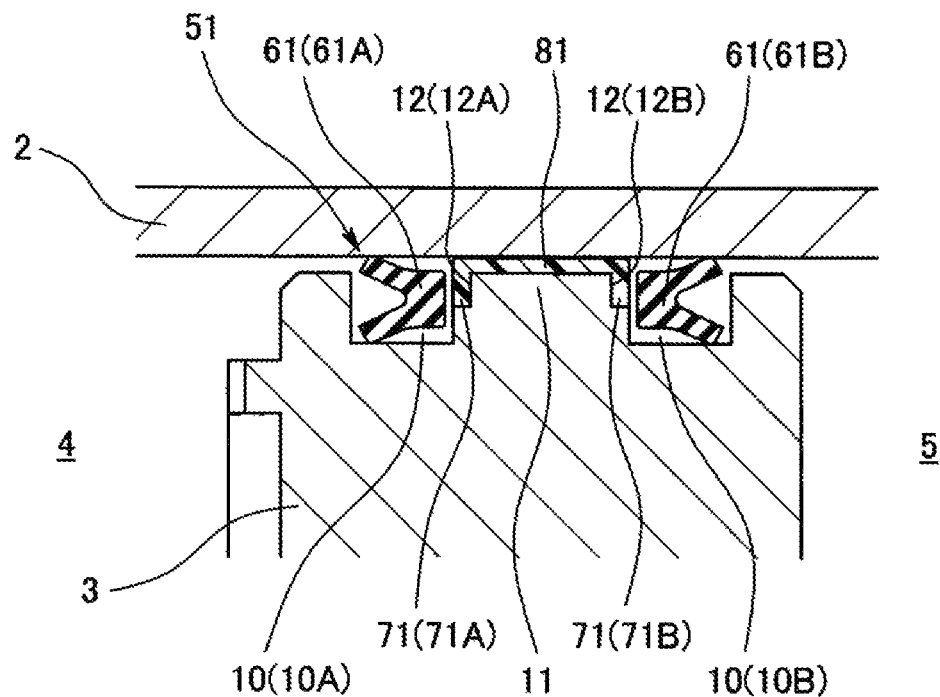
FIG. 2(A) is an enlarged view of a principal portion of FIG. 1

As illustrated in FIG. 2(A) in an enlarged manner, the sealing structure 51 has seal portions 61 sealing a seal fluid, such as seal gas or a fluid, backup ring portions 71 disposed on the rear surface sides (low-pressure side) of the seal portions 61 to back up the seal portions 61, and a bearing portion 81 coaxially holding the piston 3 to the shell 2 and is formed by combining them. Among the above, the backup ring portions 71 and the bearing portion 81 are formed into an integral structure and the backup ring portions 71 are integrally provided to end portions in the axial direction of the bearing portion 81.

The seal portions 61 contain a lip-shaped packing molded by a predetermined rubber-like elastic body and are mounted in mounting grooves 10 provided in the outer peripheral surface of the piston 3. The backup ring portions 71 and the bearing portion 81 contain resin having low friction characteristics, such as PTFE, and are fitted into a fitting portion 11 provided in the outer peripheral surface of the piston 3. Therefore, the sealing structure 51 has a form as a piston seal.

Moreover, the sealing structure 51 has a first seal portion 61A sealing seal gas, a first backup ring portion 71A disposed on the rear surface side of the first seal portion 61A to back up the first seal portion 61A, a second seal portion 61B sealing a fluid, a second backup ring portion 71B disposed on the rear surface side of the second seal portion 61B to back up the second seal portion 61B, and the bearing portion 81 coaxially holding the piston 3 to the shell 2 and is formed by combining them. Among the above, the first and second backup ring portions 71A and 71B and the bearing portion 81 are formed into an integral structure and the backup ring portions 71A and 71B are individually integrally provided to both the end portions in the axial direction of the bearing portion 81.

The first and second seal portions 61A and 61B individually contain a lip-shaped packing molded by a predetermined rubber-like elastic body and are mounted in a first or second mounting groove 10A or 10B provided in the outer peripheral surface of the piston 3. The first and second backup ring portions 71A and 71B and the bearing portion 81 contain resin having low friction characteristics, such as PTFE, and are fitted into the fitting portion 11 provided between the first and the second mounting grooves 10A and 10B in the outer peripheral surface of the piston 3.

The first and second backup ring portions 71A and 71B are individually formed into a flange shape projected radially inward from both the end portions in the axial direction of the bearing portion 81. In both the end portions in the axial direction of the fitting portion 11, step-shaped recessed portions 12A and 12B for disposing the flange-shaped backup ring portions 71A and 71B, respectively, are provided.

The sealing structure 51 of the above-described configuration has the seal portions 61, the backup ring portions 71, and the bearing portion 81, and therefore exhibits a seal function, a backup function, and a bearing function. Moreover, the backup ring portions 71 and the bearing portion 81 are formed into an integral structure, and therefore the number of components can be reduced and, since the backup ring portions 71 are held by the bearing portion 81, the stability in sliding of the backup ring portions 71 can be improved in comparison with conventional techniques.

Figure 2B:
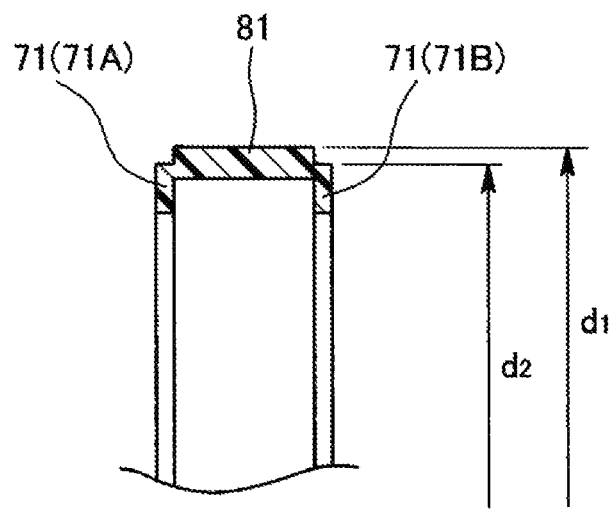
FIG. 2(B) is a cross-sectional view of a principal portion illustrating another example of the cross-sectional shape of backup ring portions and a bearing portion.

In the embodiment described above, the outer diameter dimension of the bearing portion 81 and the outer diameter dimension of the backup ring portions 71 are set to be equal, so that a flush cylindrical outer peripheral surface is formed. However, by setting an outer diameter dimension $d_1$ of the bearing portion 81 to be larger than an outer diameter dimension $d_2$ of the backup ring portions 71 as illustrated in FIG. 2(B), a gap in the radial direction may be formed between the backup ring portions 71 and the shell 2 when the bearing portion 81 contacts the inner peripheral surface of the shell 2. In this case, the backup ring portions 71 are not in contact with the inner peripheral surface of the shell 2. Therefore, the backup ring portions 71 can be prevented from contacting the inner peripheral surface of the shell 2 and being deformed in sliding.

Second Embodiment

Figure 3:
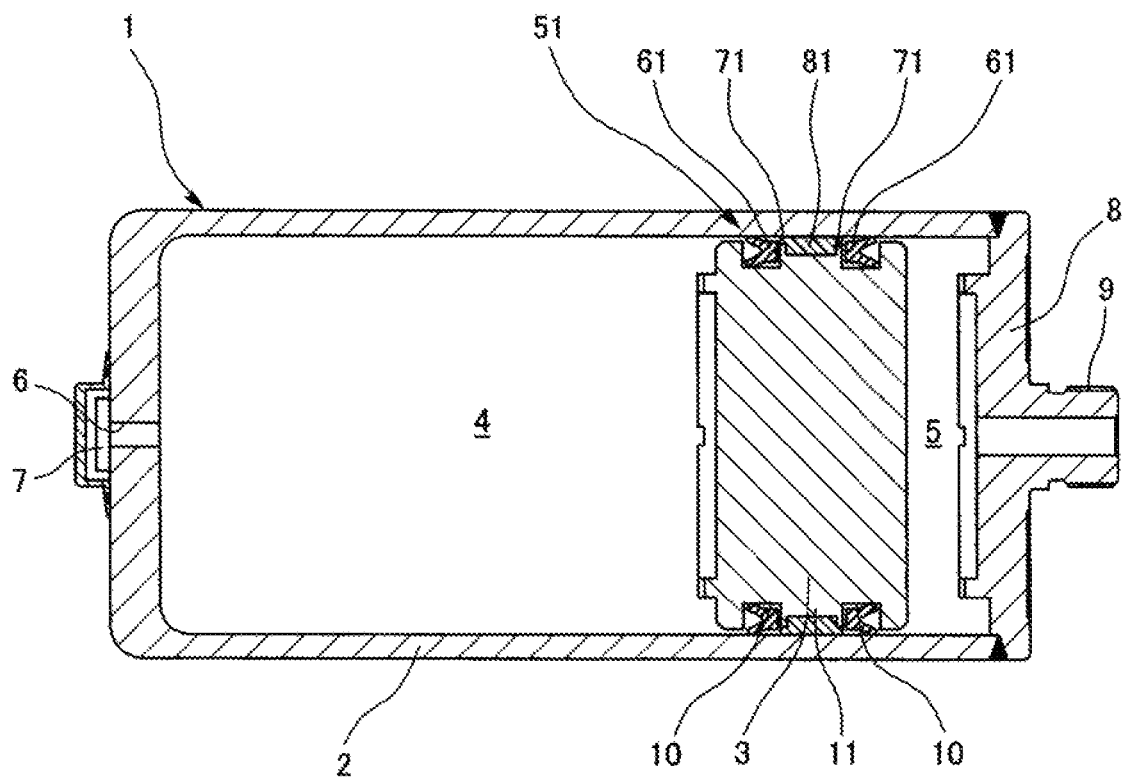
FIG. 3 is a cross-sectional view of a piston type accumulator having a sealing structure according to a second embodiment of the present invention.

FIG. 3 illustrates a piston type accumulator 1 having a sealing structure 51 according to a second embodiment of the present invention, in which the internal space of a shell 2 is divided into a gas chamber 4 sealing gas and a fluid chamber 5 introducing a fluid by the slidable insertion of a piston 3 into the shell 2 as an accumulator housing. In a bottom surface portion of the shell 2 having a bottomed cylindrical shape, a gas injection hole 6 is provided and is hermetically sealed by a plug 7, an oil port 8 is fixed to an opening portion of the shell 2, and a connection portion 9 to pressure piping is provided thereto.

Between the shell 2 and the piston 3, the sealing structure 51 according to this embodiment is provided.

Figure 4A:
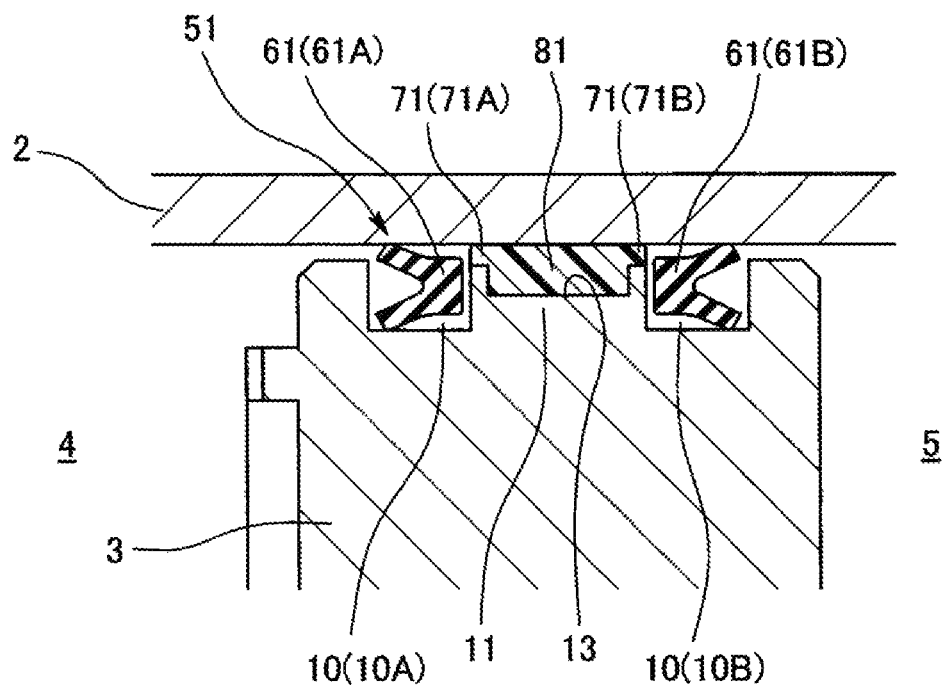
FIG. 4(A) is an enlarged view of a principal portion of FIG. 3

As illustrated in FIG. 4(A) in an enlarged manner, the sealing structure 51 has seal portions 61 sealing a seal fluid, such as seal gas or a fluid, backup ring portions 71 disposed on the rear surface sides of the seal portions 61 to back up the seal portions 61, and a bearing portion 81 coaxially holding the piston 3 to the shell 2 and is formed by combining the same. Among the above, the backup ring portions 71 and the bearing portion 81 are formed into an integral structure and the backup ring portions 71 are integrally provided to end portions in the axial direction of the bearing portion 81.

The seal portions 61 contain a lip-shaped packing molded by a predetermined rubber-like elastic body and are mounted in mounting grooves 10 provided in the outer peripheral surface of the piston 3. The backup ring portions 71 and the bearing portion 81 contain resin having low friction characteristics, such as PTFE, and are fitted into a fitting portion 11 provided in the outer peripheral surface of the piston 3. Therefore, the sealing structure 51 has a form as a piston seal.

Moreover, the sealing structure 51 has a first seal portion 61A sealing seal gas, a first backup ring portion 71A disposed on the rear surface side of the first seal portion 61A to back up the first seal portion 61A, a second seal portion 61B sealing a fluid, a second backup ring portion 71B disposed on the rear surface side of the second seal portion 61B to back up the second seal portion 61B, and the bearing portion 81 coaxially holding the piston 3 to the shell 2 and is formed by combining them. Among the above, the first and second backup ring portions 71A and 71B and the bearing portion 81 are formed into an integral structure and the backup ring portions 71A and 71B are individually integrally provided to both the end portions in the axial direction of the bearing portion 81.

The first and second seal portions 61A and 61B individually contain a lip-shaped packing molded by a predetermined rubber-like elastic body and are mounted in a first or second mounting groove 10A or 10B provided in the outer peripheral surface of the piston 3. The first and second backup ring portions 71A and 71B and the bearing portion 81 contain resin having low friction characteristics, such as PTFE, and are fitted into the fitting portion 11 provided between the first and second mounting grooves 10A and 10B in the outer peripheral surface of the piston 3.

The first and second backup ring portions 71A and 71B are individually formed into an annular protrusion shape projected in one direction or the other direction in the axial direction from both the end portions in the axial direction of the bearing portion 81. When an inner diameter dimension $d_3$ (FIG. 4(B)) of each of the first and second backup ring portions 71A and 71B is compared with an inner diameter dimension $d_4$ (FIG. 4(B)) of the bearing portion 81, the inner diameter dimension $d_4$ of the bearing portion 81 is smaller, and therefore a groove-shaped recessed portion 13 for disposing the bearing portion 81 is provided in the fitting portion 11.

The sealing structure 51 of the above-described configuration has the seal portions 61, the backup ring portions 71, and the bearing portion 81, and therefore exhibits a seal function, a backup function, and a bearing function. Moreover, the backup ring portions 71 and the bearing portion 81 are formed into an integral structure, and therefore the number of components can be reduced and, since the backup ring portions 71 are held by the bearing portion 81, the stability in sliding of the backup ring portions 71 can be improved in comparison with conventional techniques.

Figure 4B:
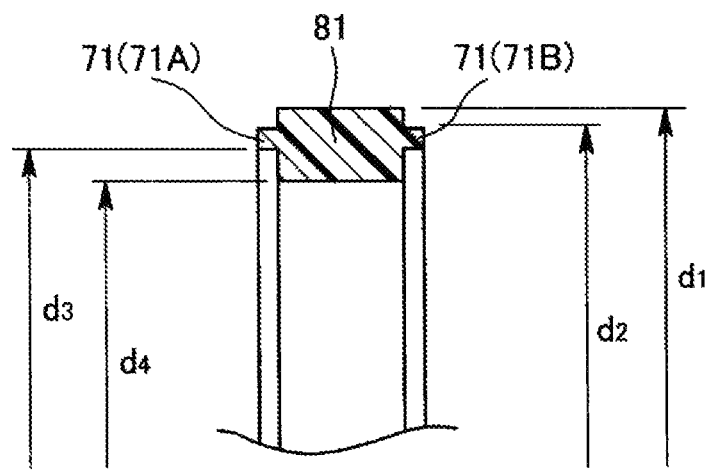
FIG. 4(B) is a cross-sectional view of a principal portion illustrating another example of the cross-sectional shape of backup ring portions and a bearing portion.

In the embodiment described above, the outer diameter dimension of the bearing portion 81 and the outer diameter dimension of the backup ring portions 71 are set to be equal, so that a flush cylindrical outer peripheral surface is formed. However, by setting an outer diameter dimension $d_1$ of the bearing portion 81 to be larger than an outer diameter dimension $d_2$ of the backup ring portions 71 as illustrated in FIG. 4(B), a gap in the radial direction may be formed between the backup ring portions 71 and the shell 2 when the bearing portion 81 contacts the inner peripheral surface of the shell 2. In this case, the backup ring portions 71 are not in contact with the inner peripheral surface of the shell 2. Therefore, the backup ring portions 71 can be prevented from contacting the inner peripheral surface of the shell 2 and being deformed in sliding.

Third Embodiment

Figure 5:
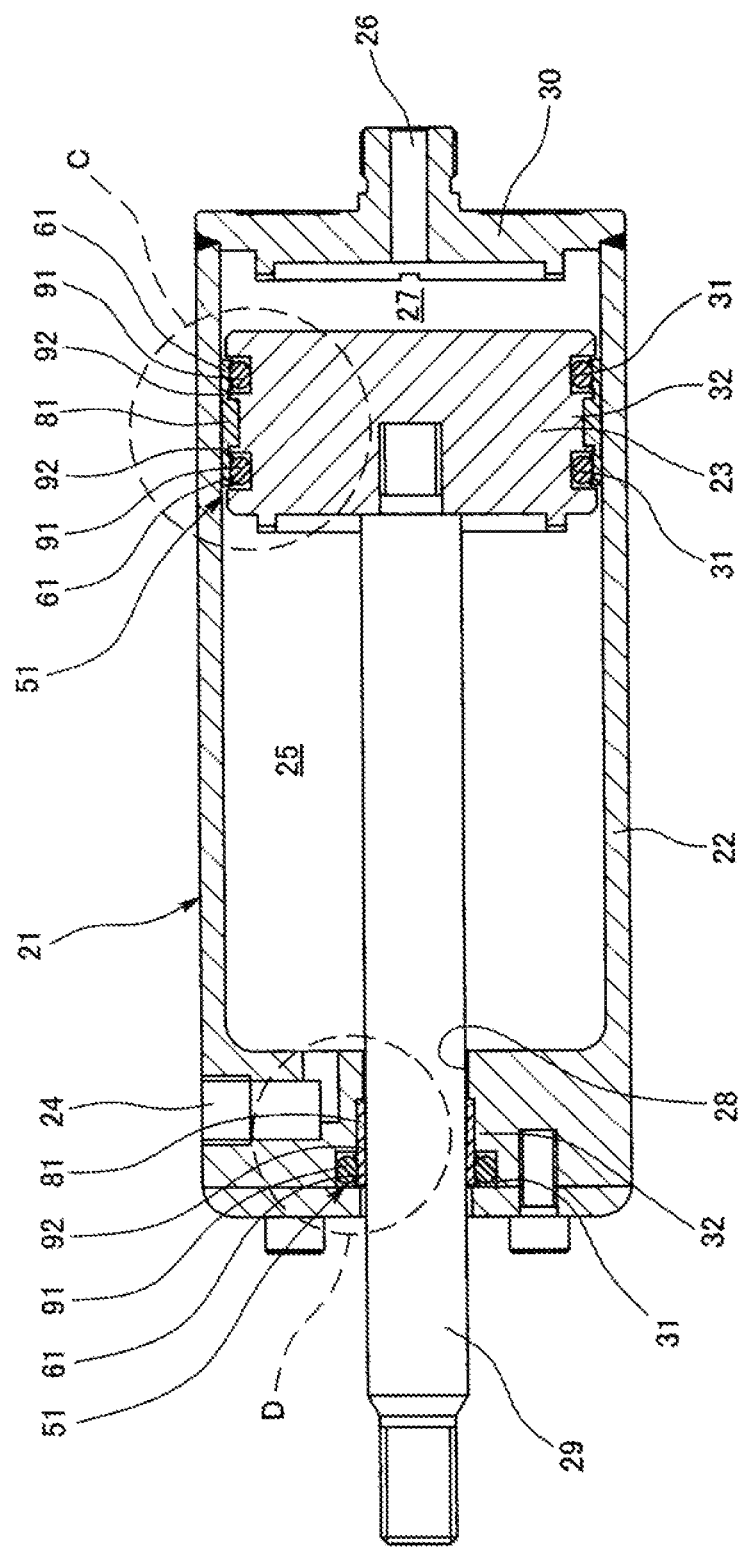
FIG. 5 is a cross-sectional view of a hydraulic cylinder having a seal structure according to a third embodiment of the present invention.

FIG. 5 illustrates a hydraulic cylinder 21 having a sealing structure 51 according to a third embodiment of the present invention, in which the internal space of a cylinder tube 22 is divided into a first pressure chamber 25 continuous to a first port 24 and a second pressure chamber 27 continuous to a second port 26 by the slidable insertion of a piston 23 into the cylinder tube 22. In a bottom surface portion of the cylinder tube 22 having a bottomed cylindrical shape, a shaft hole 28 is provided and a cylinder rod 29 is slidably inserted into and passed through the shaft hole 28. A cylinder cover 30 is fixed to an opening portion of the cylinder tube 22 and the second port 26 is provided thereto.

The sealing structure 51 according to this embodiment is provided between the cylinder tube 22 and the piston 23 (C portion of FIG. 5).

Figure 6A:
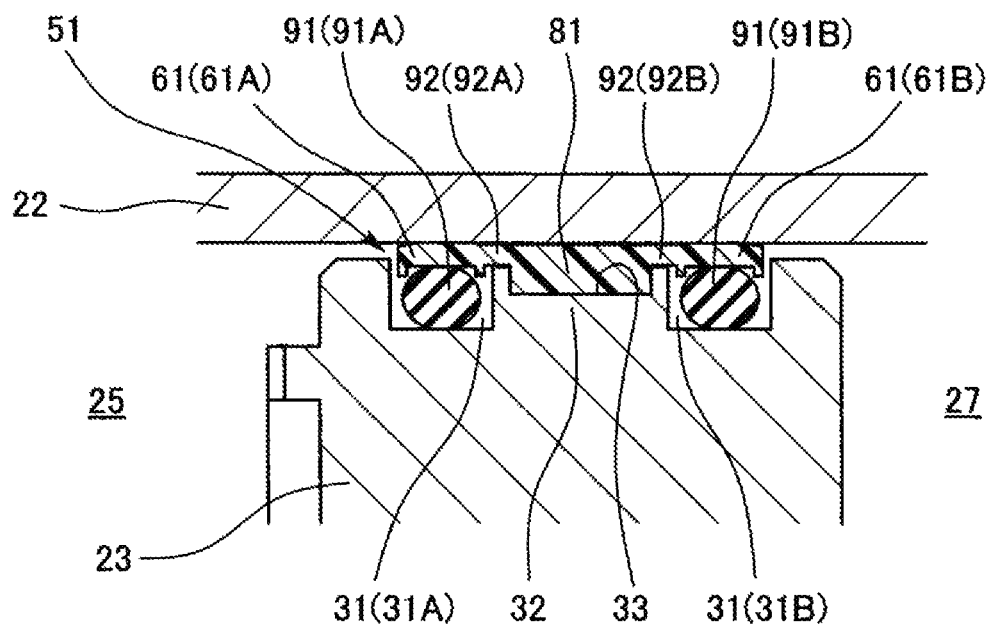
FIG. 6(A) is an enlarged view of a C portion of FIG. 5

As illustrated in FIG. 6(A) in an enlarged manner, the sealing structure 51 has seal portions 61 sealing a seal fluid, such as pressure oil, back ring portions 91 disposed on anti-sliding surface sides (inner peripheral side) of the seal portions 61 to elastically support the seal portions 61, a bearing portion 81 coaxially holding the piston 23 to the cylinder tube 22 and is formed by combining them. Among the above, the seal portions 61 and the bearing portion 81 are formed into an integral structure and the seal portions 61 are integrally provided to end portions in the axial direction of the bearing portion 81.

The seal portions 61 contain a cap-shaped packing molded with resin having low friction characteristics, such as PTFE, and are disposed in opening portions of mounting grooves 31 provided in the outer peripheral surface of the piston 23. The bearing portion 81 similarly contains resin having low friction characteristics, such as PTFE, and is fitted into a fitting portion 32 provided in the outer peripheral surface of the piston 23. The seal portions 61 and the bearing portion 81 are integrally provided through thin annular connection portions 92 having an inner diameter dimension larger than that of both the seal portions 61 and the bearing portion 81 and more specifically the seal portions 61, the connection portions 92, and the bearing portion 81 are integrally provided. A groove-shaped recessed portion 33 for disposing the bearing portion 81 is provided in the fitting portion 32. The back ring portions 91 contain a ring body, such as an O ring, molded by a predetermined rubber-like elastic body and are disposed at groove bottom portions of the mounting grooves 31. Therefore, the sealing structure 51 has a form as a piston seal.

Moreover, the sealing structure 51 has a first seal portion 61A sealing a seal fluid, such as pressure oil, on the first pressure chamber 25 side, a first back ring portion 91A disposed on the anti-sliding surface side (inner peripheral side) of the first seal portion 61A to elastically support the first seal portion 61A, a second seal portion 61B sealing a seal fluid, such as pressure oil, on the second pressure chamber 27 side, a second back ring portion 91B disposed on the anti-sliding surface side (inner peripheral side) of the second seal portion 61B to elastically support the second seal portion 61B and the bearing portion 81 coaxially holding the piston 23 to the cylinder tube 22 and is formed by combining them. Among the above, the first and second seal portions 61A and 61B and the bearing portion 81 are formed into an integral structure and the seal portions 61A and 61B are individually integrally provided to both the end portions in the axial direction of the bearing portion 81.

The first and second seal portions 61A and 61B individually contain a cap-shaped packing molded by resin having low friction characteristics, such as PTFE, and are disposed in opening portions of the first and second mounting grooves 31A and 31B provided in the outer peripheral surface of the piston 23. The bearing portion 81 similarly contains resin having low friction characteristics, such as PTFE, and is fitted into a fitting portion 32 provided in the outer peripheral surface of the piston 23. The first seal portion 61A and the bearing portion 81, and the second seal portion 61B and the bearing portion 81 are individually integrally provided through a first or second connection portion 92A or 92B having an annular shape and an inner diameter dimension larger than that of either of the first seal portion 61A, the second seal portion 61B, and the bearing portion 81 and more specifically the first seal portion 61A, the first connection portion 92A, the bearing portion 81, the second connection portion 92B, and the second seal portion 61B are integrally provided. A groove-shaped recessed portion 33 for disposing the bearing portion 81 is provided in the fitting portion 32. The first and second back ring portions 91A and 91B individually contain a ring body, such as an O ring, molded by a predetermined rubber-like elastic body and are disposed at a groove bottom portion of the first or second mounting groove 31A or 31B, respectively.

The sealing structure 51 of the above-described configuration has the seal portions 61, the back ring portions 91, and the bearing portion 81, and therefore exhibits a seal function and a bearing function. Moreover, the seal portions 61 and the bearing portion 81 are formed into an integral structure, and therefore the number of components can be reduced and, since the seal portions 61 is held by the bearing portion 81, the stability in sliding of the seal portions 61 can be improved in comparison with conventional techniques.

Figure 6B:
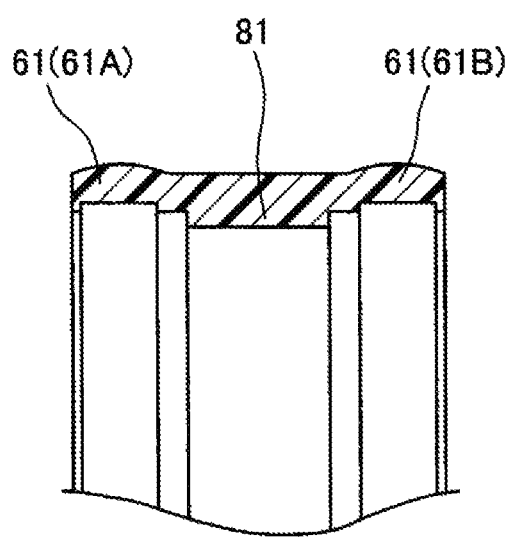
FIG. 6(B) is a cross-sectional view of a principal portion illustrating another example of the cross-sectional shape of seal portions and a bearing portion.

In the embodiment described above, although the seal portions 61 and the bearing portion 81 are integrally provided through the connection portions 92 thinner than the seal portions 61 and the bearing portion 81, the connection portions 92 may be omitted and, more specifically, the seal portions 61 and the bearing portion 81 may be directly integrally provided as illustrated in FIG. 6(B).

In this embodiment, the sealing structure 51 is separately provided also between the cylinder tube 22 and the rod 29 (D portion of FIG. 5).

Figure 7A:
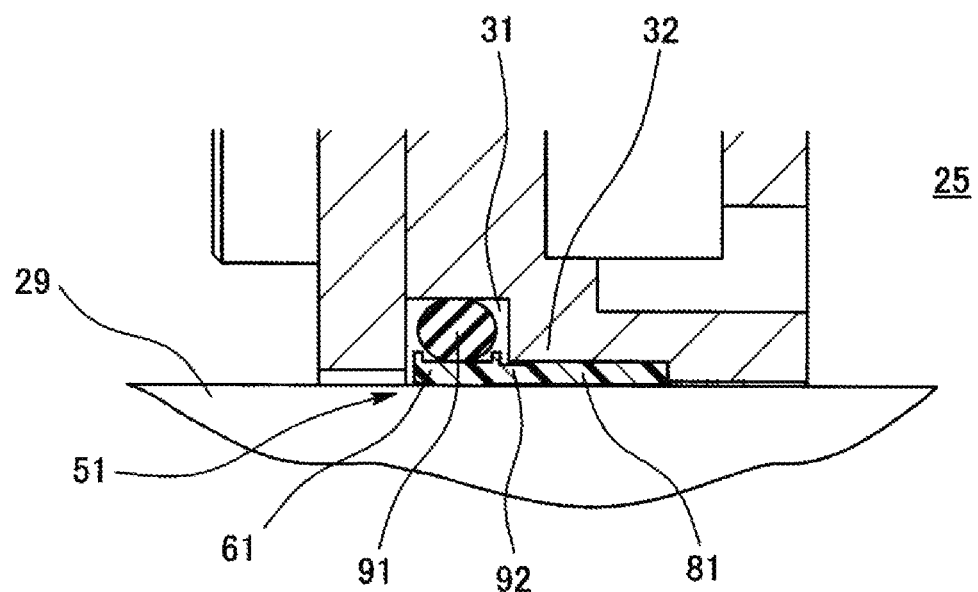
FIG. 7(A) is an enlarged view of a D portion of FIG. 5

More specifically, as illustrated in FIG. 7(A) in an enlarged manner, the sealing structure 51 has a seal portion 61 sealing a seal fluid, such as pressure oil, a back ring portion 91 disposed on an anti-sliding surface side (outer peripheral side) of the seal portion 61 to elastically support the seal portion 61, a bearing portion 81 coaxially holding the rod 29 to the cylinder tube 22 and is formed by combining them. Among the above, the seal portion 61 and the bearing portion 81 are formed into an integral structure and the seal portion 61 is integrally provided to an end portion in the axial direction of the bearing portion 81.

The seal portion 61 contains a cap-shaped packing molded with resin having low friction characteristics, such as PTFE, and is disposed in an opening portion of a mounting groove 31 provided in the inner peripheral surface of the shaft hole 28 of the cylinder tube 22. The bearing portion 81 similarly contains resin having low friction characteristics, such as PTFE, and is fitted into a fitting portion 32 provided in the inner peripheral surface of the shaft hole 28 of the cylinder tube 22. The seal portion 61 and the bearing portion 81 are integrally provided through a thin annular connection portion 92 having an outer diameter dimension smaller than that of both the seal portion 61 and the bearing portion 81 and, more specifically, the seal portion 61, the connection portion 92, and the bearing portion 81 are integrally provided. The back ring portion 91 contains a ring body, such as an O ring, molded by a predetermined rubber-like elastic body and is disposed at a groove bottom portion of the mounting groove 31. Therefore, the sealing structure 51 has a form as a rod seal.

The sealing structure 51 of the above-described configuration has the seal portion 61, the back ring portion 91, and the bearing portion 81, and therefore exhibits a seal function and a bearing function. Moreover, the seal portion 61 and the bearing portion 81 are formed into an integral structure, and therefore the number of components can be reduced and, since the seal portion 61 is held by the bearing portion 81, the stability in sliding of the seal portion 61 can be improved in comparison with conventional techniques.

Figure 7B:
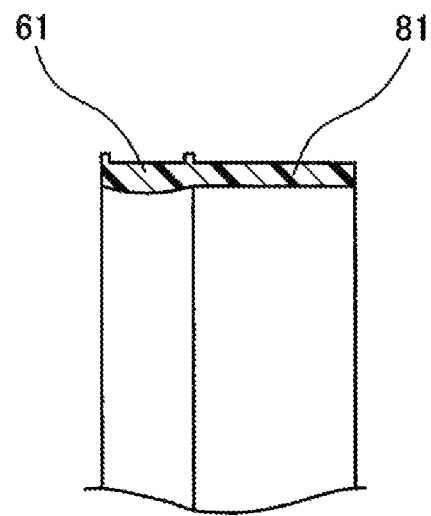
FIG. 7(B) is a cross-sectional view of a principal portion illustrating another example of the cross-sectional shape of the seal portion and the bearing portion.
Figure 8:
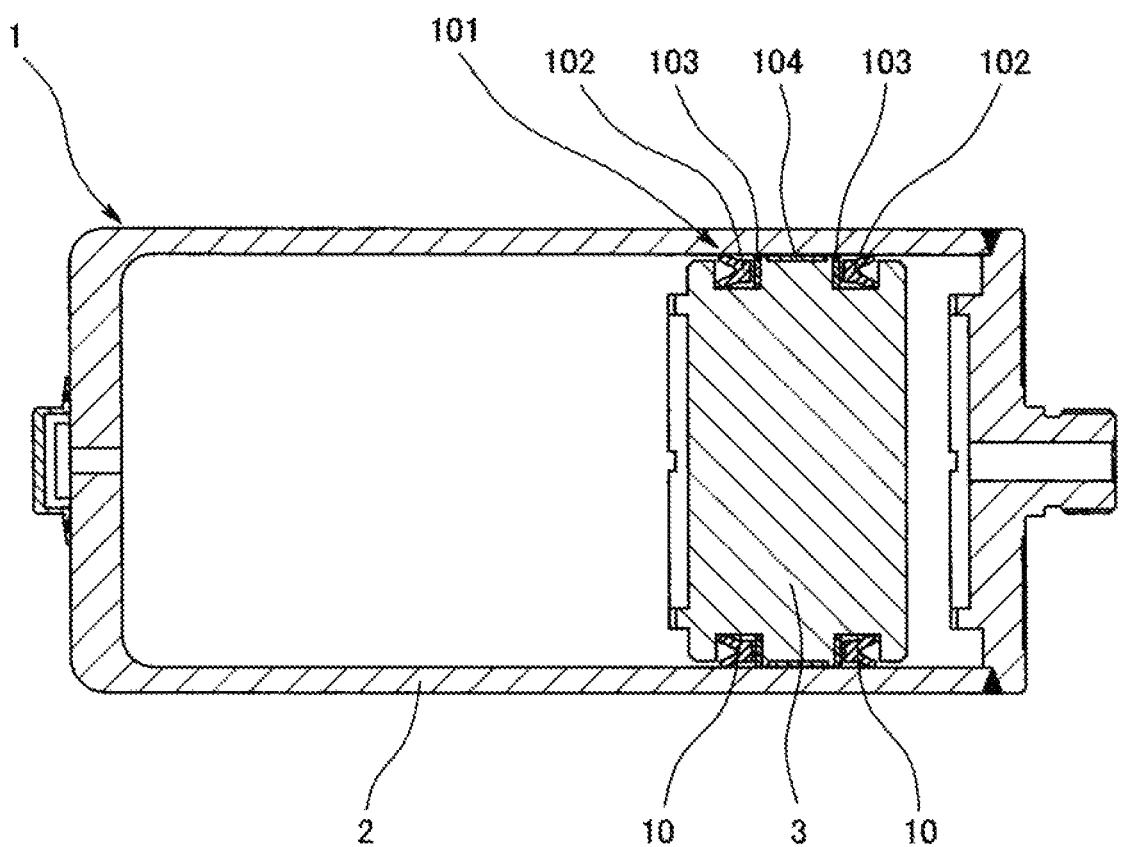
FIG. 8 is a cross-sectional view of a piston type accumulator having a sealing structure according to a conventional example.
Figure 9:
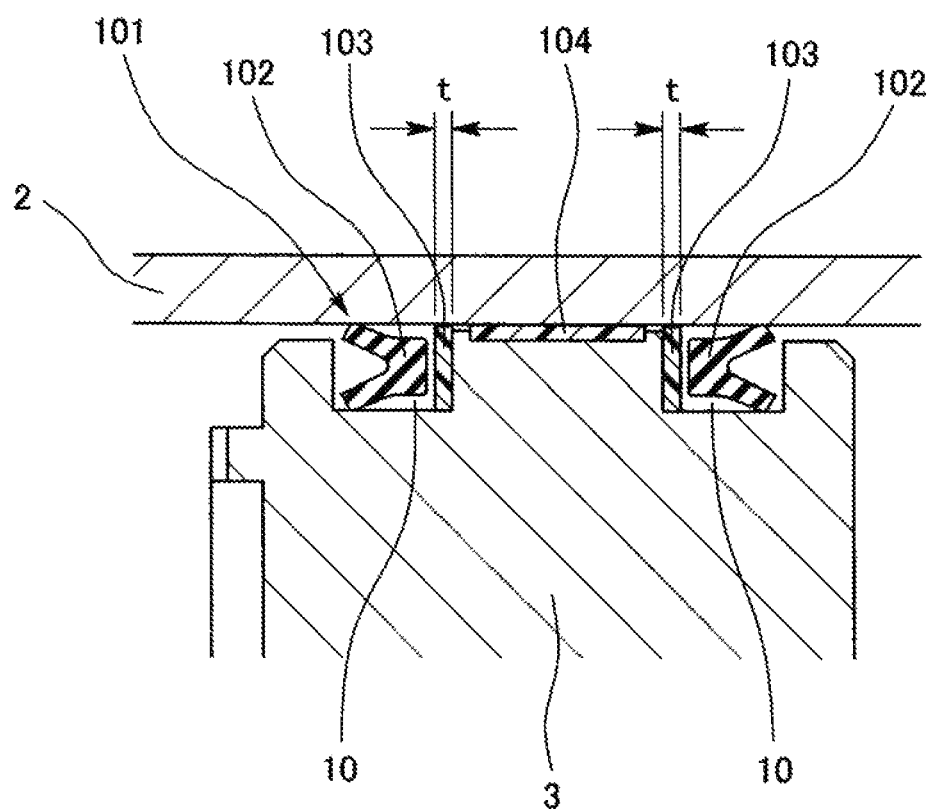
FIG. 9 is an enlarged view of a principal portion of FIG. 8.

In the embodiment described above, although the seal portion 61 and the bearing portion 81 are integrally provided through the connection portion 92 thinner than the seal portion 61 and the bearing portion 81, the connection portion 92 may be omitted and, more specifically, the seal portion 61 and the bearing portion 81 may be directly integrally provided as illustrated in FIG. 7(B).

The invention claimed is:

1. A sealing structure sealing two members which move relative to each other, the sealing structure comprising:
   a seal placed between the two members;
   a backup ring placed between the two members; and
   a bearing placed between the two members,
   wherein the backup ring and the bearing are a single integrated component formed of same material,
   an outer diameter of the bearing is larger than an outer diameter of the backup ring,
   a radial gap is formed between the backup ring and an inner peripheral surface of an outer one of the two members while the bearing is in contact with the inner peripheral surface, and
   the seal is a discrete component from the single integrated component of the backup ring and the bearing.

2. The sealing structure according to claim 1, wherein the backup ring is integrally provided to one end portion in an axial direction or both end portions in the axial direction of the bearing having a cylindrical shape.

3. The sealing structure according to claim 1, wherein the sealing structure is used as a piston seal or a rod seal in a hydraulic and pneumatic device in which a piston is inserted into a shell or a cylinder tube.

4. The sealing structure according to claim 2, wherein the sealing structure is used as a piston seal or a rod seal in a hydraulic and pneumatic device in which a piston is inserted into a shell or a cylinder tube.

* * * * *